(12) United States Patent
Yoshino et al.

(10) Patent No.: US 10,444,024 B2
(45) Date of Patent: Oct. 15, 2019

(54) METHOD AND APPARATUS FOR RECOMMENDING CHARGING FACILITIES TO USERS OF ELECTRIC VEHICLES

(71) Applicant: Nissan Motor Co., Ltd., Yokohama-shi, Kanagawa (JP)

(72) Inventors: Satoshi Yoshino, Kanagawa (JP); Takehiro Maeda, Kanagawa (JP); Yoshinori Naruoka, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/087,945

(22) PCT Filed: Mar. 31, 2016

(86) PCT No.: PCT/JP2016/060685
§ 371 (c)(1),
(2) Date: Sep. 24, 2018

(87) PCT Pub. No.: WO2017/168685
PCT Pub. Date: Oct. 5, 2017

(65) Prior Publication Data
US 2019/0025068 A1    Jan. 24, 2019

(51) Int. Cl.
*G06Q 30/00* (2012.01)
*G01C 21/34* (2006.01)
(Continued)

(52) U.S. Cl.
CPC .......... *G01C 21/3453* (2013.01); *B60L 53/31* (2019.02); *B60L 53/63* (2019.02);
(Continued)

(58) Field of Classification Search
CPC .......... G06Q 30/0631; G06Q 30/0639; G06Q 30/0641
(Continued)

(56) References Cited

U.S. PATENT DOCUMENTS

2011/0022259 A1    1/2011  Niwa
2012/0290506 A1   11/2012  Muramatsu et al.
(Continued)

FOREIGN PATENT DOCUMENTS

JP    2009244142 A    10/2009
JP    2011191109 A     9/2011
(Continued)

OTHER PUBLICATIONS

Gusrialdi, Azwirman; Zhihua Qu; Simaan, Marwan A., Scheduling and cooperative control of electric vehicles' charging at highway service stations, 2014, IEEE (Year: 2014).*

*Primary Examiner* — Brittney N Miller
(74) *Attorney, Agent, or Firm* — Young Basile Hanlon & MacFarlane, P.C.

(57) ABSTRACT

A method for guiding a user of an electric vehicle to a charging facility includes: searching for charging facilities existing within a predetermined distance from the current position of the electric vehicle; when a high-output charging facility and a low-output charging facility in a predetermined positional relationship with the high-output charging facility are searched, calculating the estimated value of a remaining charged capacity of a battery of the electric vehicle; calculating the estimated value of a charging time if charging the battery of the electric vehicle from the estimated value of the remaining charged capacity of the battery to a predetermined charged capacity at each of the searched charging facilities; and when the difference between the estimated value of the charging times at the high-output charging facility and the low-output charging facility is a predetermined value or less, presenting the low-output charging facility to the user of the electric vehicle.

12 Claims, 9 Drawing Sheets

(51) Int. Cl.
  *G06Q 30/06* (2012.01)
  *G06Q 50/06* (2012.01)
  *B60L 53/31* (2019.01)
  *B60L 58/12* (2019.01)
  *G01C 21/36* (2006.01)
  *B60L 53/63* (2019.01)
  *H02J 7/00* (2006.01)

(52) U.S. Cl.
  CPC .......... *B60L 58/12* (2019.02); *G01C 21/3407* (2013.01); *G01C 21/3469* (2013.01); *G01C 21/3679* (2013.01); *G01C 21/3682* (2013.01); *G06Q 30/0631* (2013.01); *G06Q 50/06* (2013.01); *B60L 2240/36* (2013.01); *B60L 2240/622* (2013.01); *H02J 7/007* (2013.01); *Y02T 90/168* (2013.01); *Y04S 30/12* (2013.01)

(58) Field of Classification Search
  USPC ...................... 705/26.7, 26.9, 27.1
  See application file for complete search history.

(56) References Cited

U.S. PATENT DOCUMENTS

2015/0039391 A1* 2/2015 Hershkovitz .......... G06Q 10/04
  705/7.31
2015/0241233 A1 8/2015 Loftus et al.
2015/0321570 A1* 11/2015 Cun .................... B60L 11/1803
  705/34

FOREIGN PATENT DOCUMENTS

| | | |
|---|---|---|
| JP | 2011215059 A | 10/2011 |
| JP | 2011252816 A | 12/2011 |
| JP | 2012132817 A | 7/2012 |
| JP | 2012251989 A | 12/2012 |
| WO | 2013009178 A2 | 1/2013 |

\* cited by examiner

METHOD AND APPARATUS FOR RECOMMENDING CHARGING FACILITIES TO USERS OF ELECTRIC VEHICLES

TECHNICAL FIELD

The present invention relates to a method of guiding the user of an electric vehicle to a charging facility and relates also to an information presentation apparatus.

BACKGROUND

An apparatus for guiding the driver of an electric vehicle to a charging facility is known. This apparatus is configured to display the positions of charging facilities on the display screen of a navigation device and also to display whether each of the charging facilities is for quick charge or standard charge (see JP2012-132817A, for example).

However, the driver who saw the display screen of the navigation device may wish to shorten the charging time and prioritize the use of a charging facility for quick charge (charging facility having higher output power). The problem is therefore that many drivers wish to use charging facilities for quick charge and the charging facilities for quick charge will be crowded.

SUMMARY

A problem to be solved by the present invention is to provide a method of guidance to a charging facility and an information presentation apparatus that are able to alleviate congestion at the charging facilities for quick charge which have higher output power.

The present invention solves the above problem in the following manner. Provided that there are a first charging facility and another charging facility that has lower output power than that of the first charging facility and is in a predetermined positional relationship with the first charging facility, when the difference between the estimated value of a charging time at the first charging facility and the estimated value of a charging time at the other charging facility is a predetermined value or less, the other charging facility is presented as a recommended charging facility to the user of an electric vehicle.

According to the present invention, actual charging times at the first charging facility and at the other charging facility having lower output power than that of the first charging facility are taken into account to present the other charging facility to the user of the electric vehicle, and an effect is therefore obtained that the congestion at the first charging facility having higher output power can be alleviated.

DETAILED DESCRIPTION

Hereinafter, one or more embodiments of the present invention will be described with reference to the drawings.

Figure 1:
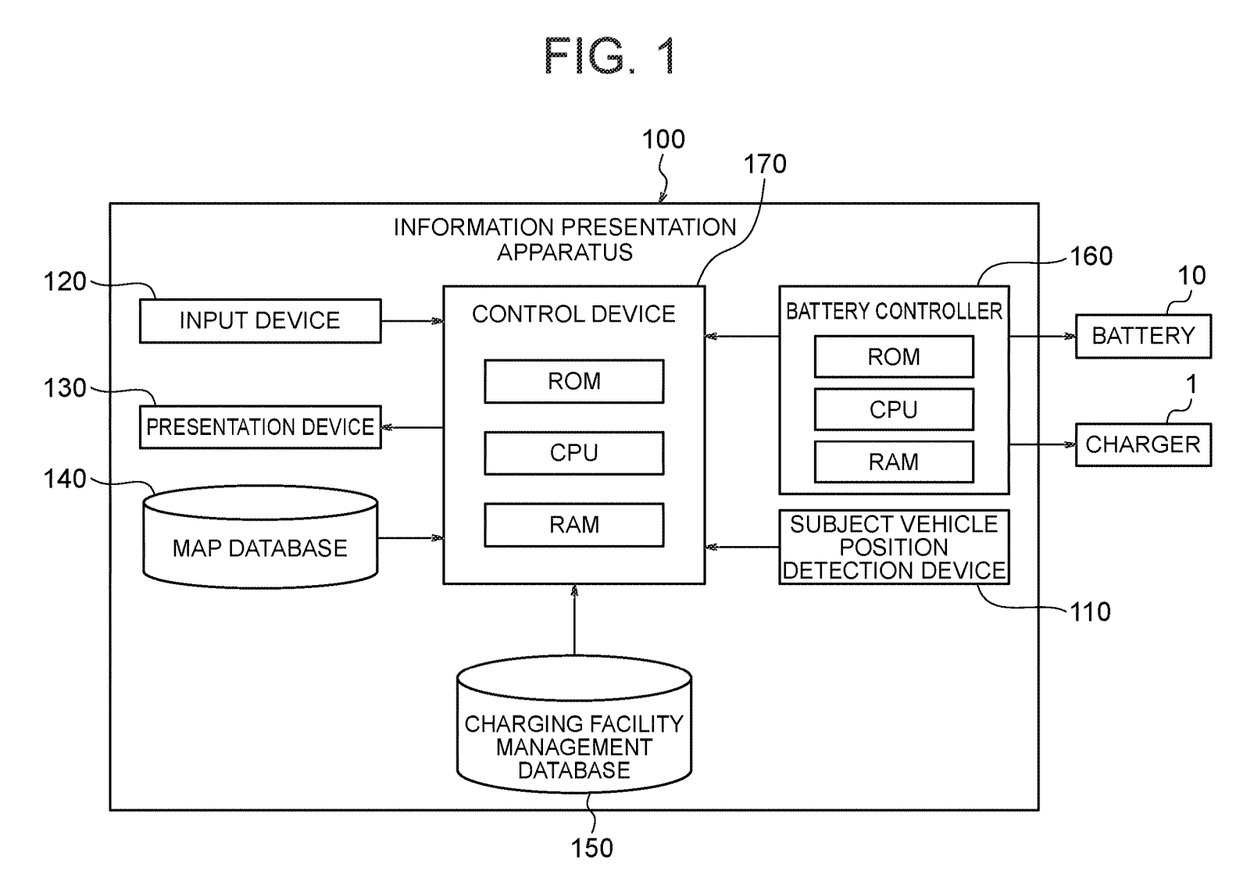
FIG. 1 is a block diagram illustrating the configuration of an information presentation apparatus according to one or more embodiments of the present invention.

FIG. 1 is a block diagram illustrating the configuration of an information presentation apparatus 100 according to one or more embodiments of the present invention to which the method of guidance to a charging facility of the present invention is applied. The information presentation apparatus 100 is an apparatus that presents various information items including information on guidance to a charging facility to the user of an electric vehicle, such as an electric car or a plug-in hybrid car.

As illustrated in FIG. 1, the information presentation apparatus 100 comprises a subject vehicle position detection device 110, an input device 120, a presentation device 130, a map database 140, a charging facility management database 150, a battery controller 160, and a control device 170. These components are connected to one another via a controller area network (CAN) or other in-vehicle LAN for mutually exchanging information.

The subject vehicle position detection device 110 comprises a GPS receiver, a gyro-sensor, a vehicle speed sensor, and other necessary components. The subject vehicle position detection device 110 receives radio waves transmitted from GPS transmitters using the GPS receiver to periodically acquire positional information of the subject vehicle and detects the current position of the subject vehicle on the basis of the acquired positional information of the subject vehicle, angle variation information of the subject vehicle acquired from the gyro-sensor, and vehicle speed information of the subject vehicle acquired from the vehicle speed sensor. The detected current position of the subject vehicle is output to the control device 170.

The input device 120 is a device for receiving an input instruction from the user of an electric vehicle. Examples of the input device 120 include a touch panel-type input device provided on the display of a navigation device, an input device such as a joystick or a push button, and a voice input device such as a microphone. As will be described later, the input device 120 allows for an operation of selecting a charging facility displayed on the display of the navigation device, and charging facility selection information is input.

The presentation device 130 is a device for presenting various information items to the user, including information on guidance to a charging facility. Examples of the presentation device 130 include a display of the navigation device, a display provided on the instrument panel, and a speaker. The presentation device 130 of the present embodiment is a display of the navigation device.

The map database 140 stores map data. The map data stored in the map database 140 are referred to by the control device 170 when searching for the route from the current position of the electric vehicle to a destination and when presenting the positions of charging facilities to the user of the electric vehicle.

The charging facility management database 150 stores detailed information on charging facilities. The detailed information on charging facilities stored in the charging facility management database 150 includes information on the latitude/longitude of a position at which each charging facility is installed and information as to whether a charger 1 of the charging facility is a high-output charger or a low-output charger. In one or more embodiments of the present invention, the high-output charger corresponds to a so-called quick charger, and the low-output charger corresponds to a so-called standard charger. When classifying the chargers 1 into two groups in accordance with whether the output is high or low, classifying them into the quick chargers and the standard chargers is not essential. Likewise, when classifying the chargers 1 into two types in accordance with whether the output is high or low, classifying them into two groups is not essential, and they may also be classified into three or more groups.

The battery controller 160 is a controller that manages the state of a battery 10 and is also a controller that controls a charger 1 of the charging facility. The battery 10 to be managed by the battery controller 160 is a battery configured by connecting a plurality of secondary cells such as lithium ion secondary cells and nickel hydrogen secondary cells. The battery 10 is the power source of an electric vehicle. Chargers 1 to be controlled by the battery controller 160 include a high-output charger (so-called quick charger) 1A and a low-output charger (so-called standard charger) 1B having the maximum output power lower than that of the high-output charger 1A. The chargers 1 to be controlled by the battery controller 160 may further include a charger having an output between those of the high-output charger 1A and the low-output charger 1B, a charger having a higher output than that of the high-output charger 1A, a charger having a lower output than that of the low-output charger 1B, and the like.

The battery controller 160 calculates a present state of charge (SOC: State of Charge, or charge rate) of the battery 10 on the basis of the detected values of the current, voltage, temperature, etc. of the battery 10. The battery controller 160 also calculates a command value for controlling the charging by the charger 1 on the basis of the SOC measurement value of the battery 10, the temperature of the battery 10, and the like and outputs the command value to the charger 1.

The battery controller 160 comprises a read only memory (ROM) that stores programs for calculating the SOC of the battery 10 and controlling the charger 1, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

Figure 2:
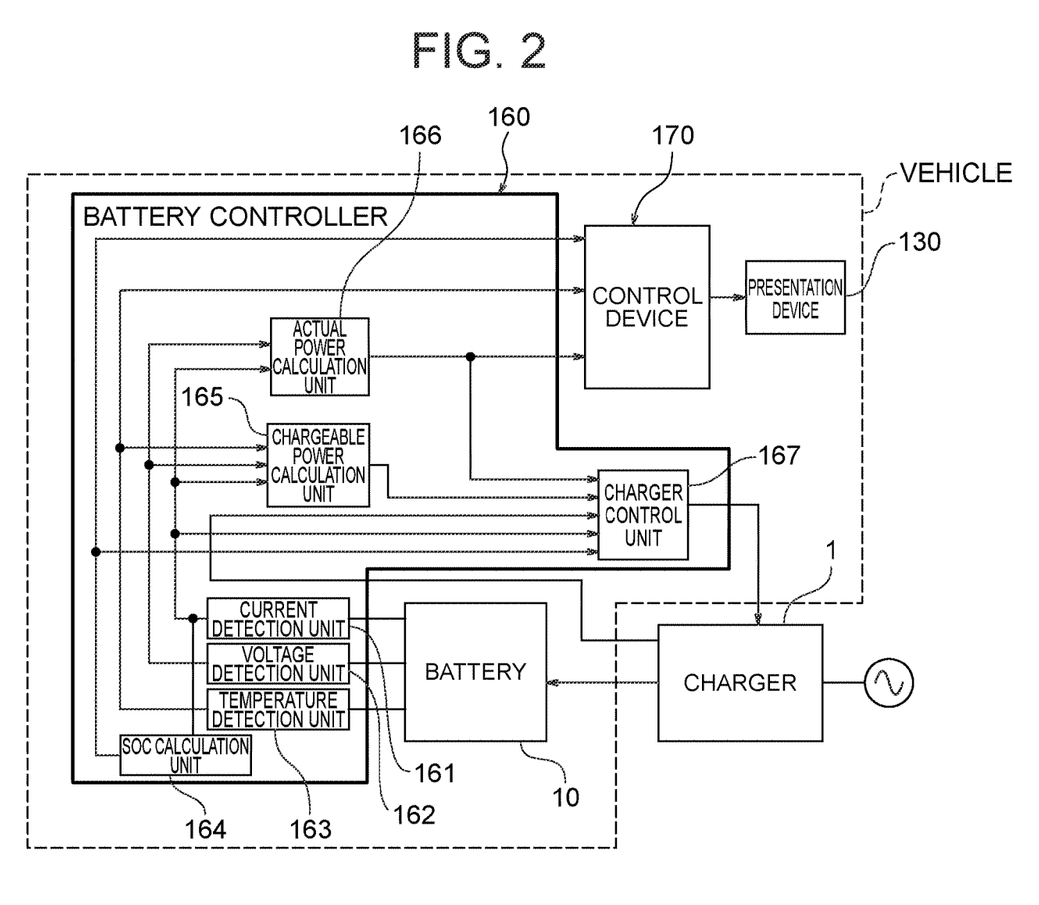
FIG. 2 is a block diagram for describing functions of a battery controller of the information presentation apparatus illustrated in FIG. 1.

FIG. 2 is a block diagram for describing functions of the battery controller 160. As illustrated in the figure, the battery controller 160 comprises a current detection unit 161, a voltage detection unit 162, a temperature detection unit 163, an SOC calculation unit 164, a chargeable power calculation unit 165, an actual power calculation unit 166, and a charger control unit 167.

The current detection unit 161 is a sensor that detects the current of the battery 10. The current detection unit 161 outputs the detection value to the SOC calculation unit 164, the chargeable power calculation unit 165, the actual power calculation unit 166, and the charger control unit 167.

The voltage detection unit 162 is a sensor that detects the voltage of the battery 10. The voltage detection unit 162 detects the voltage of each of a plurality of cells included in the battery 10 and the total voltage of the plurality of cells. The voltage detection unit 162 outputs the detection values to the chargeable power calculation unit 165 and the actual power calculation unit 166.

The temperature detection unit 163 is a sensor that detects the temperature of the battery 10. The temperature detection unit 163 outputs the detection value to the chargeable power calculation unit 165, the actual power calculation unit 166, the charger control unit 167, and the control device 170.

The SOC calculation unit 164 accumulates the detection values detected by the current detection unit 161 to integrate the charging current and calculate the SOC of the battery 10. The SOC calculation unit 164 outputs the calculated SOC to the charger control unit 167 and the control device 170.

In addition or alternatively, the SOC calculation unit 164 may calculate the SOC of the battery 10 from the detection value of the voltage detection unit 162. Here, there is a correlationship between the voltage of the battery 10 and the SOC of the battery 10. When calculating the SOC of the battery 10 from the detection value of the voltage detection unit 162, therefore, the SOC calculation unit 164 may refer to a map representing the correlationship between the voltage of the battery 10 and the SOC of the battery 10 to read out the SOC corresponding to the detection value of the voltage detection unit 162 and output it as the SOC of the battery 10. The map may be preliminarily stored in the ROM.

As will be understood, the correlationship between the voltage of the battery 10 and the SOC of the battery 10 varies depending on the degree of deterioration of the battery 10; therefore, the above map is preferably a map that reflects the degree of deterioration of the battery 10. The degree of deterioration of the battery 10 may be calculated, for example, from the internal resistance of the battery 10.

The chargeable power calculation unit 165 calculates the chargeable power of the battery 10 from the detection values of the current detection unit 161, the voltage detection unit 162, and the temperature detection unit 163. The chargeable power is the maximum power with which the battery 10 can be charged without promoting the deterioration of the battery 10 during the charging and is the maximum input power that can be input from the charger 1 to the battery 10. In general, the chargeable power is also referred to as the allowable input power, the maximum chargeable power, or the maximum allowable input power, and is described as "chargeable power" in one or more embodiments of the present invention. The chargeable power calculation unit 165 calculates the chargeable power in the following manner.

In the battery 10, an upper limit charging voltage is set for each cell in accordance with the performance of the battery 10. The upper limit charging voltage is a voltage that is preliminarily determined as an upper limit to prevent deterioration of the battery when charging the battery 10. The upper limit charging voltage is set to a voltage at which the precipitation of lithium starts inside cells that constitute the battery 10 or a voltage lower than the voltage at which the precipitation of lithium starts.

The upper limit charging voltage is calculated in accordance with the charging current input to the battery 10, the battery temperature, and the internal resistance of the battery 10. For example, the upper limit charging voltage is calculated to be lower as the charging current of the battery 10 is larger, and calculated to be higher as the charging current of the battery 10 is smaller.

When the battery 10 is composed of a plurality of cells, the voltage of a cell having the highest voltage among the plurality of cells has to be suppressed up to the upper limit charging voltage. The chargeable power calculation unit 165 specifies the cell having the highest voltage with reference to the voltage of each cell detected by the voltage detection unit 162. The chargeable power calculation unit 165 calculates an allowable input current that can be input to the battery 10, on the basis of the voltage of the specified cell, the internal resistance of the cell, and the charging current and upper limit charging voltage of the cell.

The allowable input current is calculated from the internal resistance of the cell having the highest terminal voltage and the upper limit charging voltage of the cell. The internal resistance of a cell is calculated from the terminal voltage of the cell, which is detected by the voltage detection unit 162, and the charging current of the cell. The chargeable power calculation unit 165 outputs the calculated chargeable power to the charger control unit 167.

The actual power calculation unit 166 calculates the charging power which is actually supplied from the charger 1 to the battery 10 (referred to as "actual power," hereinafter) during the charging of the battery 10. The actual power is lower than the output power of the charger 1 due to the internal resistance of the battery 10 and the like. The actual power calculation unit 166 calculates the actual power from the detection value of the current detection unit 161 and the detection value of the voltage detection unit 162. The actual power calculation unit 166 outputs the calculated value of the actual power to the charger control unit 167.

The charger control unit 167 controls the charger 1 on the basis of the current detected by the current detection unit 161, the chargeable power calculated by the chargeable power calculation unit 165, the actual power of the battery 10 calculated by the actual power calculation unit 166, and the available output power of the charger 1.

The available output power of the charger 1 corresponds to the rated output power of the charger 1 and is the maximum value of the power which the charger 1 can output. That is, the available output power is a value that is preliminarily set in accordance with the charging ability of the charger 1, and the output power of the charger 1 is limited to the available output power or less. The available output power of a charger 1 is different depending on the charger 1. When a charger 1 and the battery 10 are connected via a cable or the like, therefore, the charger control unit 167 communicates with the charger 1 and acquires information on the available output power of the charger 1. Communication between the charger 1 and the charger control unit 167 may be performed using a communication line in the cable connecting between the charger 1 and the battery 10.

The charger control unit 167 acquires the available output power from the charger 1 and acquires the chargeable power from the chargeable power calculation unit 165. The charger control unit 167 compares the available output power with the chargeable power and uses the comparison result and the SOC of the battery 10 to set the power to be supplied from the charger 1 to the battery 10. Here, as the SOC of the battery 10 decreases, the power which can be input to the battery 10 increases, and the available output power of the charger 1 may be lower than the chargeable power of the battery 10. On the other hand, as the SOC of the battery 10 increases, the power which can be input to the battery 10 decreases, and the chargeable power of the battery 10 may be lower than the available output power of the charger 1.

When the chargeable power of the battery 10 is not lower than the available output power of the charger 1, the charger control unit 167 sets the power to be supplied from the charger 1 to the battery 10 to the available output power of the charger 1 and outputs a command signal to the charger 1. In response to the command signal, the charger 1 starts charging of the battery 10 with the available output power.

On the other hand, when the chargeable power of the battery 10 is lower than the available output power of the charger 1, the charger control unit 167 sets the power to be supplied from the charger 1 to the battery 10 to the chargeable power of the battery 10 and outputs a command signal to the charger 1. In response to the command signal, the charger 1 starts charging of the battery 10 with the power lower than the available output power.

During the charging of the battery 10, the chargeable power calculation unit 165 calculates the chargeable power of the battery 10 on the basis of the detection results of the current detection unit 161 and the like and transmits the calculated chargeable power to the charger control unit 167, which compares the chargeable power of the battery 10 with the available output power of the charger 1. When the chargeable power of the battery 10 transitions from the state of being higher than the available output power of the charger 1 to the state of being lower than the available output power of the charger 1, the charger control unit 167 outputs a control signal to the charger 1 so that the power supplied from the charger 1 to the battery 10 becomes lower than the available output power of the charger 1. In response to the control signal from the charger control unit 167, the charger 1 lowers the output current to reduce the power supplied to the battery 10.

In addition or alternatively, the charger control unit 167 outputs a control signal to the charger 1 so that the power supplied to the battery 10 gradually decreases as the SOC of the battery 10 increases. As the SOC of the battery 10 increases, the charger 1 gradually lowers the output current to reduce the power supplied to the battery 10.

Figure 3:
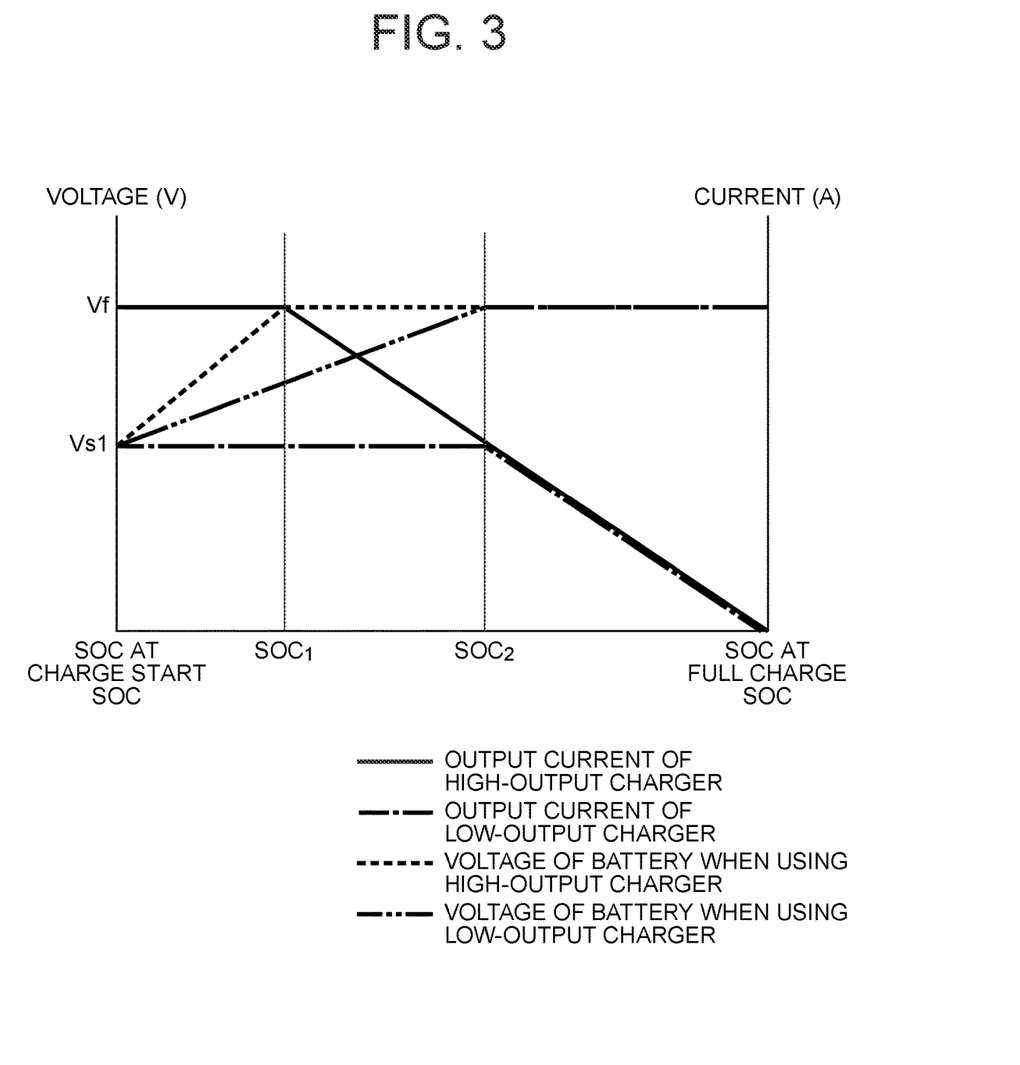
FIG. 3 is a diagram illustrating the relationship between the voltage of a battery and the output current of a charger under an ordinary-temperature environment.

FIG. 3 is a diagram illustrating the relationship between the voltage of the battery 10 and the output current of the charger 1 under an ordinary-temperature environment. In this figure, the output current of the high-output charger 1A is indicated by a solid line and the output current of the low-output charger 1B is indicated by a dashed-dotted line. Also in this figure, the voltage of the battery 10 when charged using the high-output charger 1A is indicated by a broken line and the voltage of the battery 10 when charged using the low-output charger 1B is indicated by a dashed-two dotted line. In FIG. 3, for example, the SOC at the start of charging is 50%, the SOC1 and SOC2 are 70% and 90%, respectively, and the SOC at full charge is 100%. It is assumed that the voltage of the battery 10 at the start of charging is Vs1 and the upper limit charging voltage is Vf.

As illustrated in FIG. 3, in a state in which the voltage of the battery 10 is low (i.e. a state in which the SOC is relatively low, such as the SOC 1 or less), the output current of the charger 1 is maintained at the maximum value which can be output, but as the voltage of the battery 10 increases (i.e., as the SOC increases beyond the SOC1), the output current of the charger 1 decreases. Here, as the voltage of the battery 10 increases (i.e., as the SOC increases beyond the SOC1), the difference between the output currents of the high-output charger 1A and low-output charger 1B becomes small. Thus, in a state in which the SOC at the start of charging of the battery 10 is high, the difference in the time (charging time) from the start of charging to the completion of charging is small between the case of charging with the high-output charger 1A and the case of charging with the low-output charger 1B.

Figure 4:
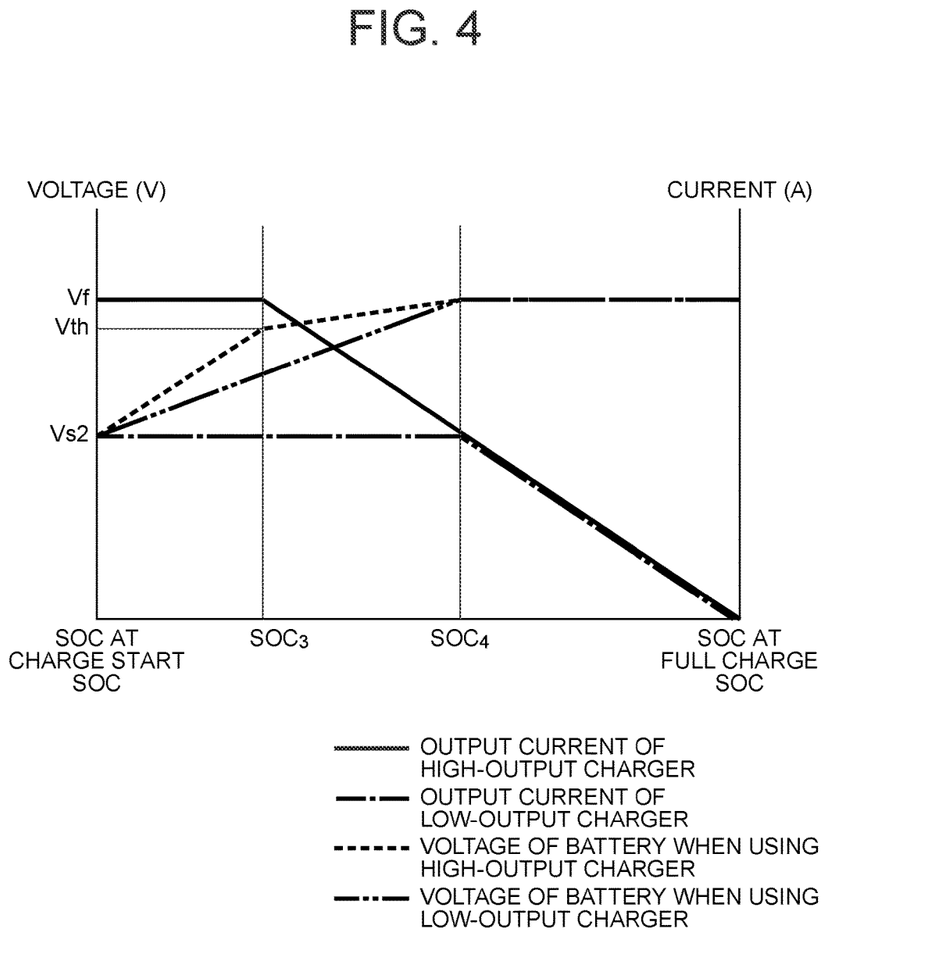
FIG. 4 is a diagram illustrating the relationship between the voltage of a battery and the output current of a charger under a low-temperature environment.

FIG. 4 is a diagram illustrating the relationship between the voltage of the battery 10 and the output current of the charger 1 under a low-temperature environment. In this figure, the output current of the high-output charger 1A is indicated by a solid line and the output current of the low-output charger 1B is indicated by a dashed-dotted line, while the voltage of the battery 10 when charged using the high-output charger 1A is indicated by a broken line and the voltage of the battery 10 when charged using the low-output charger 1B is indicated by a dashed-two dotted line. In FIG. 4, for example, the SOC at the start of charging is 0%, the SOC3 and SOC4 are 10% and 85%, respectively, and the SOC at full charge is 100%. It is assumed that the voltage of the battery 10 at the start of charging is Vs2, the upper limit charging voltage at full charge is Vf, and the upper limit charging voltage at low temperature is Vth.

In general, in a lithium ion battery, as the temperature of the battery decreases and as the charging current increases, lithium is more likely to precipitate. For this reason, as the temperature of the battery decreases and as the charging current increases, a lower upper limit charging voltage is set, and the charging current is controlled so that the battery voltage does not exceed the upper limit charging voltage.

This will be more specifically described. As illustrated in FIG. 4, when charging is performed using the high-output charger 1A under the low-temperature environment, a lower upper limit charging voltage Vth than the ordinary upper limit charging voltage Vf is set, and as the SOC of the battery increases, the voltage of the battery 10 increases from a voltage Vs2 at the start of charging and reaches the upper limit charging voltage Vth (in FIG. 4, the SOC becomes the state at the time of the SOC3). When the voltage of the battery 10 reaches the upper limit charging voltage Vth, the charging current is suppressed so that the voltage of the battery does not exceed the upper limit charging voltage Vth, and the upper limit charging voltage Vth increases with the suppression of the charging current. By repeating this, the upper limit charging voltage Vth gradually increases to Vf and the charging current also gradually decreases. After the voltage of the battery 10 reaches the upper limit charging voltage Vth, both the output current of the high-output charger 1A and the output current of the low-output charger 1B decrease in the same manner as in the case of the ordinary temperature of the battery 10 illustrated in FIG. 3.

Thus, under the low-temperature environment, the lower upper limit charging voltage than that under the ordinary-temperature environment is set and, therefore, the difference between the output currents of the high-output charger 1A and low-output charger 1B further decreases as compared with that under the ordinary-temperature environment regardless of the voltage (SOC) of the battery 10. As such, under the low-temperature environment, the difference in the charging time is small between the case of charging with the high-output charger 1A and the case of charging with the low-output charger 1B regardless of the voltage (SOC) of the battery 10.

Referring again to FIG. 1, the control device 170 comprises a read only memory (ROM) that stores programs for presenting guidance information on charging facilities and the like to the user, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

Figure 5:
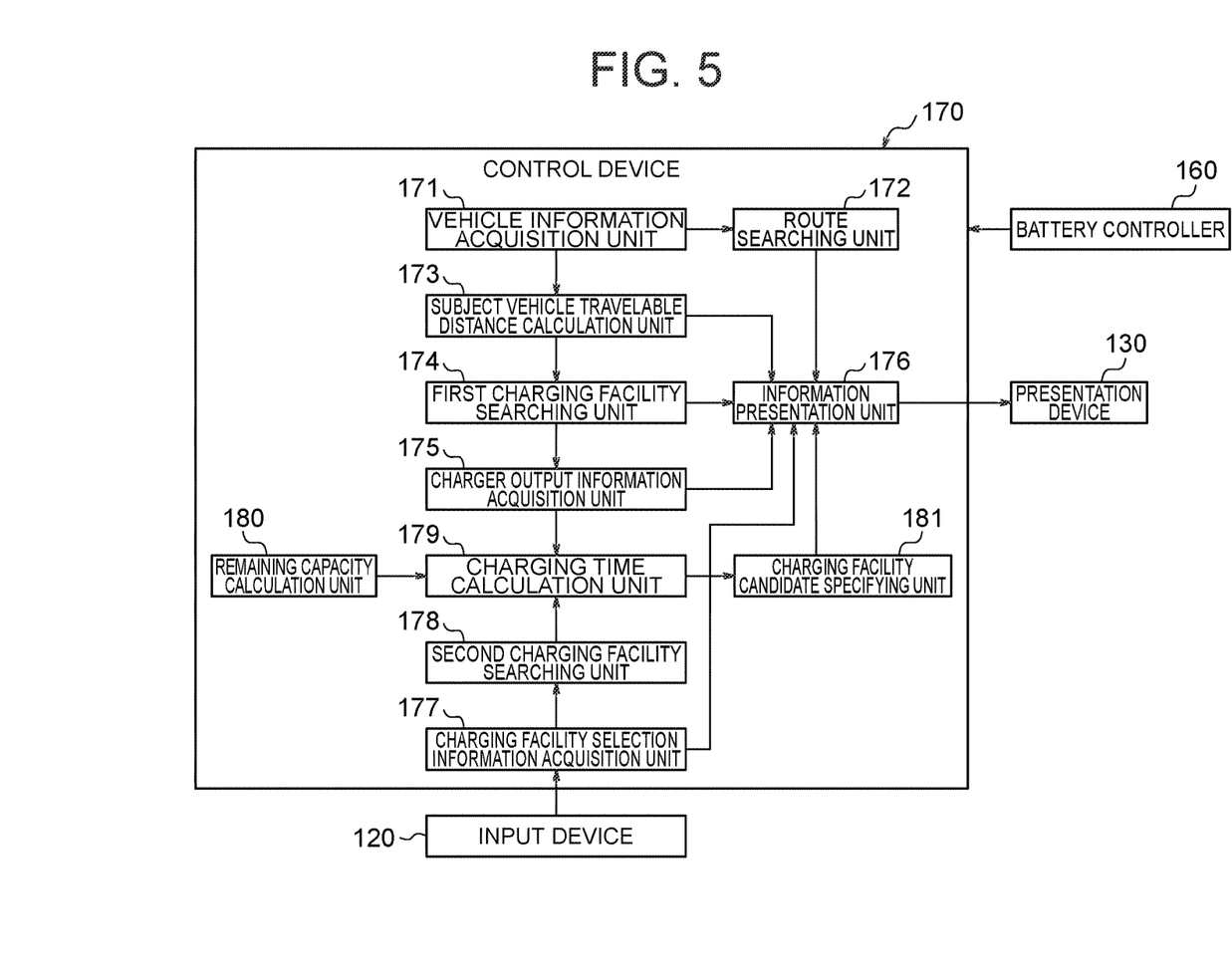
FIG. 5 is a block diagram for describing the functions of a control device of the information presentation apparatus illustrated in FIG. 1.

FIG. 5 is a block diagram for describing functions of the control device 170. As illustrated in the figure, the control device 170 comprises a vehicle information acquisition unit 171, a route searching unit 172, a subject vehicle travelable distance calculation unit 173, a first charging facility searching unit 174, a charger output information acquisition unit 175, an information presentation unit 176, a charging facility selection information acquisition unit 177, a second charging facility searching unit 178, a charging time calculation unit 179, a remaining capacity calculation unit 180, and a charging facility candidate specifying unit 181.

The vehicle information acquisition unit 171 acquires information regarding the subject vehicle. Examples of the information regarding the subject vehicle include information on the SOC of the battery 10 output from the battery controller 160, information on the current position of the subject vehicle output from the subject vehicle position detection device 110, and information on the destination output from the input device 120.

The route searching unit 172 refers to the map information stored in the map database 140 to search for a travel route from the current position of the subject vehicle to the destination which is set by the user. The information on the current position of the subject vehicle can be acquired from the subject vehicle position detection device 110 by the vehicle information acquisition unit 171, and the information on the destination can be acquired from the input device 120 by the vehicle information acquisition unit 171. The route searching unit 172 outputs the information on the searched travel route to the information presentation unit 176.

The subject vehicle travelable distance calculation unit 173 calculates a travelable distance of the subject vehicle on the basis of the SOC of the battery 10 output from the vehicle information acquisition unit 171 and information on the rated capacity of the battery 10 of the subject vehicle. The subject vehicle travelable distance calculation unit 173 outputs the information on the calculated travelable distance to the first charging facility searching unit 174 and the information presentation unit 176.

The first charging facility searching unit 174 searches for charging facilities that fall within a range of the travelable distance which is output from the subject vehicle travelable distance calculation unit 173, on the basis of the positional information of charging facilities stored in the charging facility management database 150. The first charging facility searching unit 174 outputs the positional information of the searched charging facilities to the charger output information acquisition unit 175 and the information presentation unit 176.

The charger output information acquisition unit 175 acquires output information of the charging facilities searched by the first charging facility searching unit 174 from the charging facility management database 150. The output information of the charging facilities includes the above available output power (rated output power) of each charger 1. The charger output information acquisition unit 175 outputs the acquired information on the charging facilities to the information presentation unit 176 and the charging time calculation unit 179.

The information presentation unit 176 controls the display of the navigation device to display the current position of the subject vehicle acquired by the vehicle information acquisition unit 171, the travel route output from the route searching unit 172, the travelable distance of the subject vehicle output from the subject vehicle travelable distance calculation unit 173, and the positions of the charging facilities output from the first charging facility searching unit 174. The information presentation unit 176 controls the display of the navigation device to display a mark A indicating the current position of the vehicle and a mark B indicating the travelable distance of the subject vehicle (see FIGS. 6 and 7). In addition, the information presentation unit 176 controls the display of the navigation device to display marks C indicating charging facilities installed with high-output chargers and marks D indicating charging facilities installed with low-output chargers (see FIGS. 6 and 7).

The charging facility selection information acquisition unit 177 acquires charging facility selection information output from the input device 120. Here, when the mark of a charging facility displayed on the display of the navigation device is selected through the operation of the input device 120 by the user, the charging facility selection information is output from the input device 120 to the charging facility selection information acquisition unit 177. The charging facility selection information acquisition unit 177 outputs the acquired charging facility selection information to the information presentation unit 176 and the second charging facility searching unit 178. The information presentation unit 176 controls the display of the navigation device to display a mark E identifying the selected charging facility.

Figure 6:
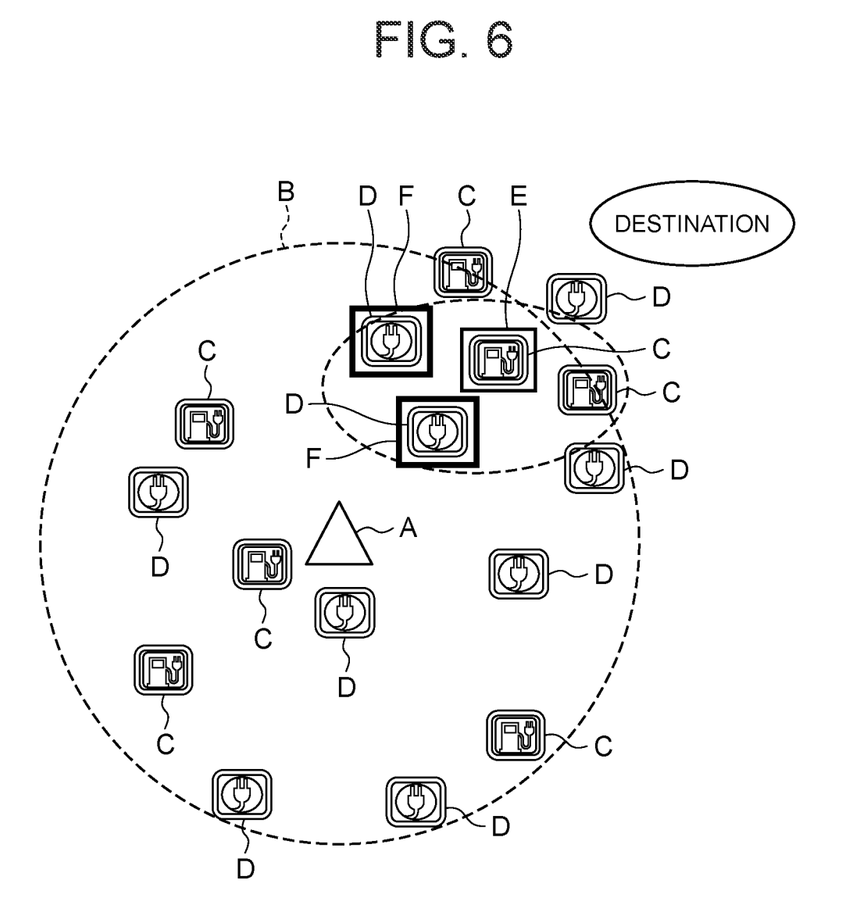
FIG. 6 is a diagram illustrating a display screen of the information presentation apparatus when a destination is set.
Figure 7:
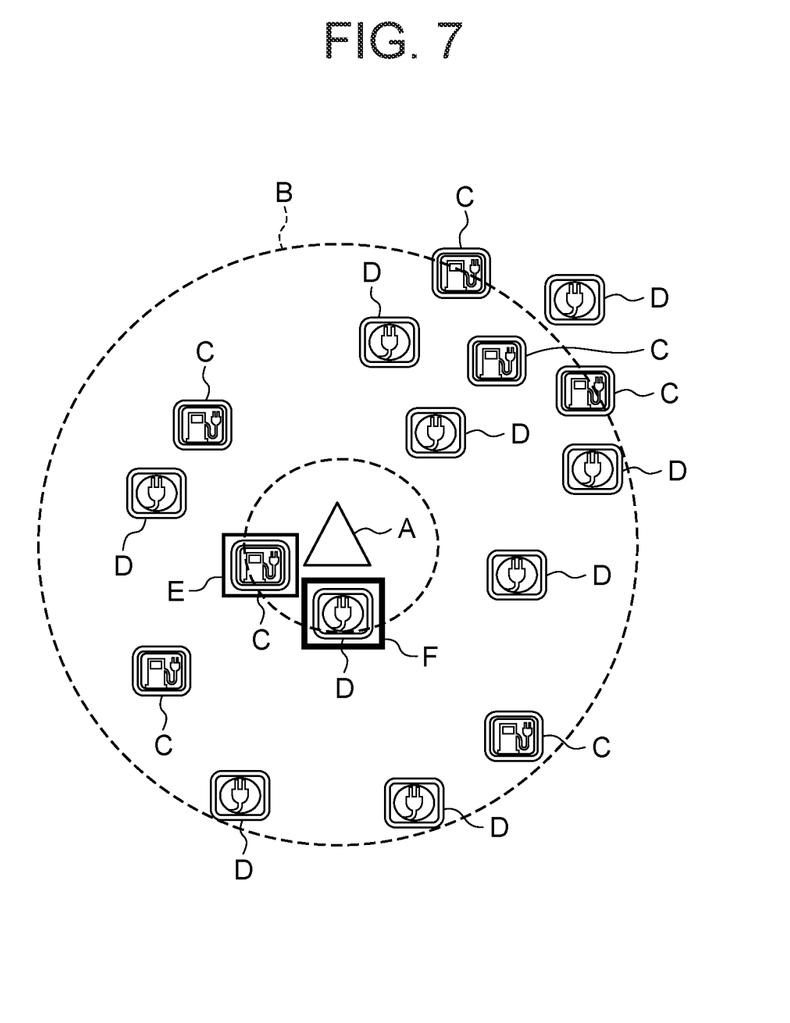
FIG. 7 is a diagram illustrating a display screen of the information presentation apparatus when a destination is not set.

When a high-output charging facility is selected through the operation of the input device 120 by the user, the second charging facility searching unit 178 searches for a low-output charging facility that is in a predetermined positional relationship with the selected charging facility. The predetermined positional relationship as used herein refers to a positional relationship in which the estimated value of a moving time from the current position of the subject vehicle is approximately the same (e.g., the time difference is 0 to 10 minutes). Here, as illustrated in FIG. 6, when a destination is set and a high-output charging facility selected by the user is present between the subject vehicle and the destination, the second charging facility searching unit 178 searches for a low-output charging facility to which the distance from the charging facility selected by the user is a predetermined distance (e.g. 1 to 10 km) or less. On the other hand, as illustrated in FIG. 7, when a destination is not set or the charging facility selected by the user is not present between the subject vehicle and the destination, the second charging facility searching unit 178 searches for a low-output charging facility at which the difference between the distance from the current position of the subject vehicle to the low-output charging facility and the distance from the current position of the subject vehicle to the high-output charging facility selected by the user is a predetermined distance (e.g. 1 to 10 km) or less. The second charging facility searching unit 178 outputs information on the searched low-output charging facility to the charging time calculation unit 179.

The charging time calculation unit 179 calculates a charging time T1 (estimated value) required for the battery 10 of the subject vehicle to be fully charged at the high-output charging facility selected by the user and a charging time T2 (estimated value) required for the battery 10 of the subject vehicle to be fully charged at the low-output charging facility searched by the second charging facility searching unit 178. The charging time calculation unit 179 calculates the charging time T1, T2 on the basis of the temperature detected by the temperature detection unit 163 of the battery controller 160, the SOC of the battery 10 calculated by the SOC calculation unit 164 of the battery controller 160, the maximum output power of the charger 1 acquired by the charger output information acquisition unit 175 of the control device 170, and the charging power (actual power) calculated by the actual power calculation unit 166 of the battery controller 160. The charging time calculation unit 179 outputs the information on the charging time T1, T2 to the charging facility candidate specifying unit 181.

Here, a method of calculating the charging time T1, T2 will be described.

Figure 8:
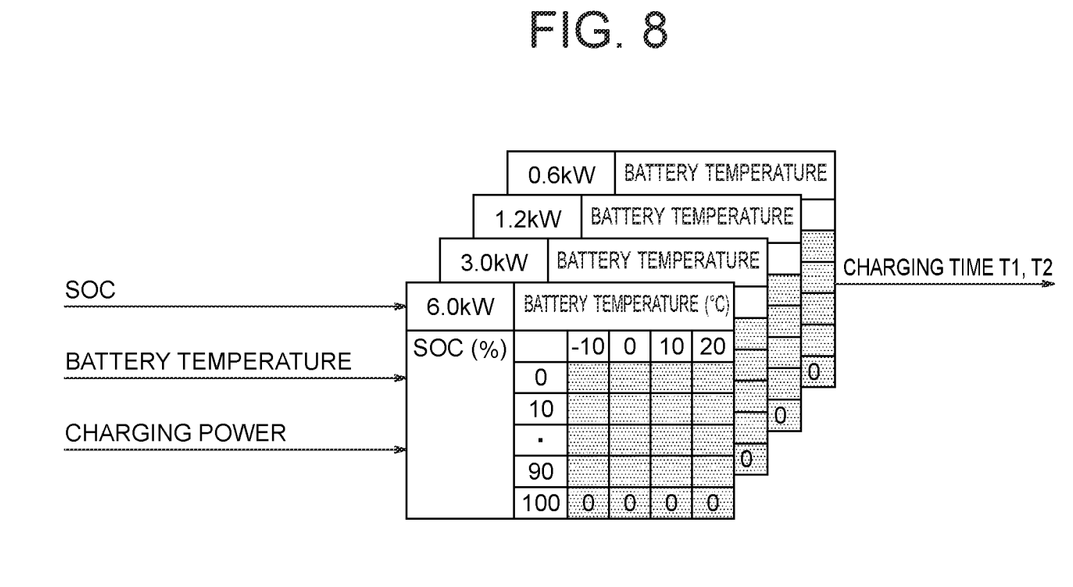
FIG. 8 is a schematic diagram of maps representing the relationships between the charging power, temperature, and SOC of a battery and the charging time.

The ROM of the control device 170 preliminarily stores a plurality of maps as illustrated in FIG. 8. FIG. 8 is a schematic diagram of the maps representing the relationships between the charging power, temperature, and SOC of the battery 10 and the charging time. As illustrated in the figure, the charging time T1, T2 for the battery 10 has correlationships with the charging power, temperature, and SOC of the battery 10. That is, the lower the temperature of the battery 10, the longer the charging time T1, T2, and the lower the SOC of the battery 10, the longer the charging time T1, T2.

The charging time calculation unit 179 extracts a map corresponding to the charging power of the battery 10 calculated by the actual power calculation unit 166, from among the plurality of maps stored in the ROM of the control device 170. Here, when the chargeable power of the battery 10 is less than the available output power of the charger 1, the charging power of the battery 10 calculated by the actual power calculation unit 166 gradually decreases. Accordingly, the charging time calculation unit 179 extracts an appropriate map so as to match the decrease in the charging power of the battery 10.

Then, the charging time calculation unit 179 refers to the extracted map to extract the charging time T1, T2 corresponding to the temperature detected by the temperature detection unit 163 and the SOC calculated by the SOC calculation unit 164.

Here, the charging time calculation unit 179 calculates not only the remaining charging time during the charging but also the charging time after the subject vehicle arrives at the charging facility, during traveling of the vehicle. The remaining capacity calculation unit 180 therefore calculates the charged capacity of the battery 10 at the time when the vehicle arrives at the charging facility, and outputs it to the charging time calculation unit 179.

The remaining capacity calculation unit 180 calculates the distance from the current position of the subject vehicle to the charging facility on the basis of the positional information of the subject vehicle output from the vehicle position detection device 110 and the positional information of the charging facility stored in the charging facility management database 150. Here, the ROM of the control device 170 stores a map representing the relationship between the travel distance and the power consumption, and the remaining capacity calculation unit 180 refers to the map to extract the power consumption corresponding to the calculated travel distance. Then, the remaining capacity calculation unit 180 calculates the difference between the charged capacity of the battery 10 corresponding to the SOC of the battery 10 calculated by the SOC calculation unit 164 and the calculated power consumption, that is, the charged capacity of the battery 10 at the time when the subject vehicle arrives at the charging facility.

The internal resistance of the battery 10 increases as the temperature of the battery 10 decreases. Here, the power consumption W is represented by the following equation (1). The power consumption (W) therefore increases as the temperature of the battery 10 decreases even when the travel distance is the same.

$$\text{Power consumption } W = \text{Current } I \times \text{Voltage } V = \text{Current } I \times \text{Current } I \times \text{Resistance } R \quad (1)$$

Accordingly, the above map referred to by the remaining capacity calculation unit 180 may represent the relationships among the temperature of the battery 10, the travel distance, and the power consumption. This allows for calculation of the charged capacity of the battery 10 at the time when the vehicle arrives at the charging facility with a higher degree of accuracy. Thus, the charging time after the vehicle arrives at the charging facility can be calculated with a higher degree of accuracy while the subject vehicle is traveling.

The charging facility candidate specifying unit 181 determines whether or not the difference between the charging times T1 and T2 output from the charging time calculation unit 179 is a predetermined value (e.g. 0 to 10 minutes) or less. When there is a low-output charging facility at which the difference between the charging times T1 and T2 is the predetermined value or less among the low-output charging facilities searched by the second charging facility searching unit 178, the charging facility candidate specifying unit 181 specifies the low-output charging facility and outputs the charging facility candidate specifying information to the information presentation unit 176. When receiving the charging facility candidate specifying information, the information presentation unit 176 controls the display of the navigation device to display one or more marks F that recommend the corresponding charging facility or facilities (see FIGS. 6 and 7).

Figure 9:
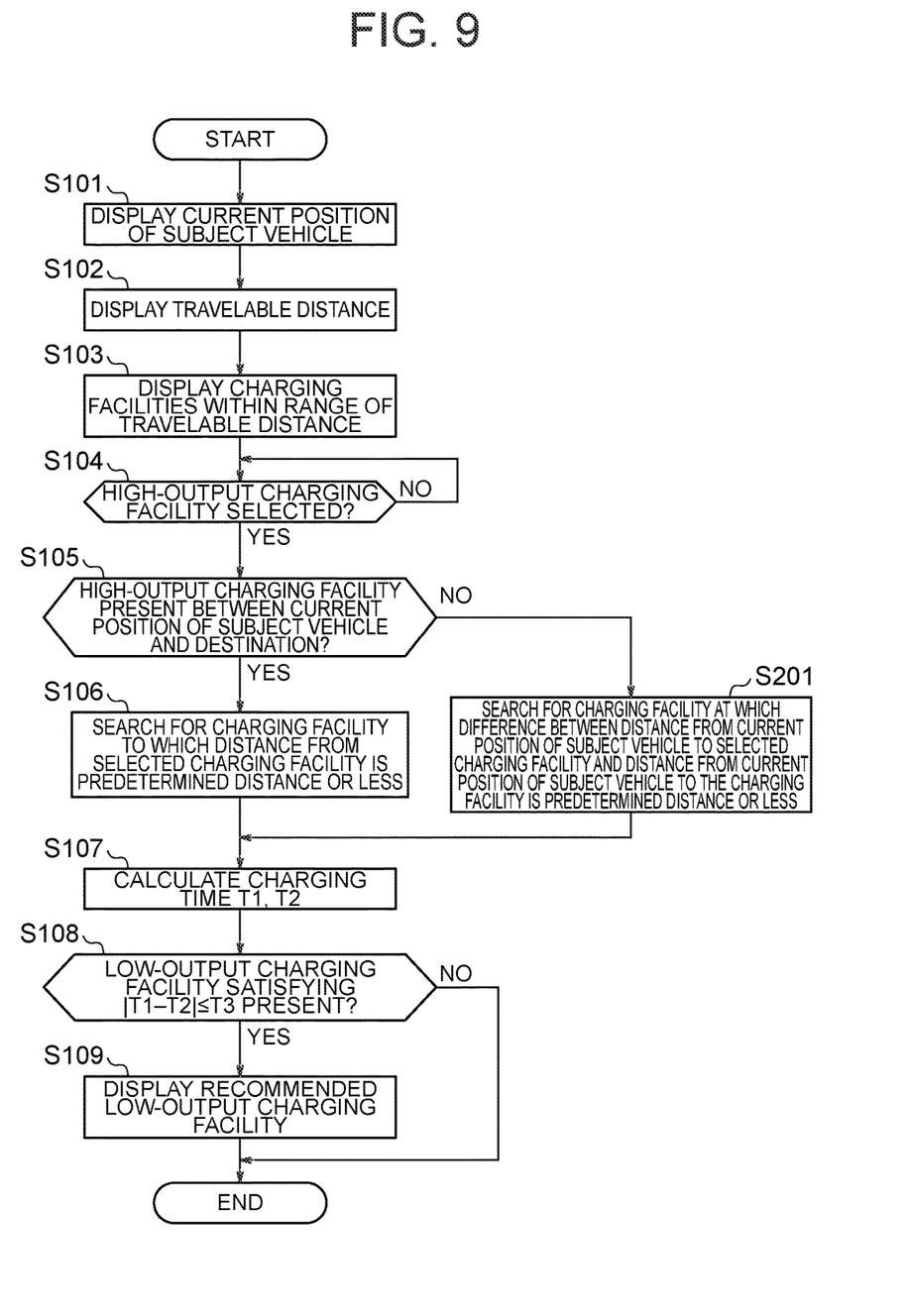
FIG. 9 is a flowchart for describing a process executed by the information presentation apparatus.

FIG. 9 is a flowchart for describing a process executed by the information presentation apparatus 100.

First, in step S101, the information presentation unit 176 controls the display of the navigation device to display a mark A that represents the current position of the subject vehicle (see FIGS. 6 and 7), on the basis of the information on the current position of the subject vehicle output from the subject vehicle position detection device 110. Then, in step S102, the information presentation unit 176 controls the display of the navigation device to display a mark B that represents the travelable distance of the subject vehicle, on the basis of the information on the travelable distance of the subject vehicle output from the subject vehicle travelable distance calculation unit 173.

Then, in step S103, the information presentation unit 176 controls the display of the navigation device to display the charging facilities existing within a range of the travelable distance output from the first charging facility searching unit 174. In this operation, the information presentation unit 176 determines whether the charger of each charging facility is a high-output charger or a low-output charger on the basis of the output information of the charging facility acquired by the charger output information acquisition unit 175. When the charger is a high-output charger, a mark C representing it is displayed, while when the charger is a low-output charger, a mark D representing it is displayed.

Then, in step S104, the second charging facility searching unit 178 determines whether or not a high-output charging facility is selected using the input device 120. When a determination is made that a high-output charging facility is selected, the routine proceeds to step S105. In step S105, the second charging facility searching unit 178 determines whether or not the high-output charging facility selected using the input device 120 is present between the current position of the subject vehicle and the destination. Determination of presence is followed by step S106, while determination of absence is followed by step S201.

In step S106, the second charging facility searching unit 178 searches for a low-output charging facility that is in a predetermined positional relationship with the high-output charging facility selected using the input device 120. In this step, the predetermined positional relationship is a positional relationship in which the distance from the high-output charging facility selected using the input device 120 is a predetermined distance (e.g. 1 to 10 km) or less.

On the other hand, in step S201, the second charging facility searching unit 178 searches for a low-output charging facility that is in another predetermined positional relationship with the high-output charging facility selected using the input device 120. In this step, the predetermined positional relationship is a positional relationship in which the difference between the distance from the current position of the subject vehicle to the high-output charging facility and the distance from the current position of the subject vehicle to the low-output charging facility is a predetermined distance (e.g. 1 to 10 km) or less.

Steps S106 and S201 are followed by step S107 in which the charging time calculation unit 179 calculates a charging time T1 required for the battery 10 of the subject vehicle to be fully charged at the charging facility selected using the input device 120 and a charging time T2 required for the battery 10 of the subject vehicle to be fully charged at the charging facility searched by the second charging facility searching unit 178.

Then, in step S108, the charging facility candidate specifying unit 181 determines whether or not there is a low-output charging facility at which the difference between the charging times T1 and T2 output from the charging time calculation unit 179 is a predetermined value T3 or less (|T1−T2|≤T3). Determination of the presence of such a low-output charging facility is followed by step S109, while determination of the absence concludes the process.

In step S109, the charging facility candidate specifying unit 181 outputs the charging facility candidate specifying information for specifying the charging facility at which the difference between the charging times T1 and T2 is within the predetermined range to the information presentation unit 176. The information presentation unit 176 controls the display of the navigation device to display one or more marks F that recommend the low-output charging facility or facilities included in the charging facility candidate specifying information and a mark E that represents the charging facility selected using the input device 120 (see FIGS. 6 and 7).

As described above, in the method of guidance to a charging facility and the information presentation apparatus 100 according to one or more embodiments of the present invention, when the difference between the estimated value of the charging time T1 at the high-output charging facility (e.g. a charging facility provided with a quick charger) and the estimated value of the charging time T2 at the low-output charging facility (e.g. a charging facility provided with a standard charger), which is in a predetermined positional relationship with the high-output charging facility, is a predetermined value or less, the low-output charging facility is presented to the user of the electric vehicle. That is, the actual charging times T1 and T2 at the high-output charging facility and at the low-output charging facility are taken into account to present the low-output charging facility to the user of the electric vehicle while suppressing disadvantages due to prolongation of the charging time for the electric vehicle used by the user. This can increase the number of users who wish to use the low-output charging facility, and the congestion at the high-output charging facility can be alleviated.

As illustrated in FIG. 3, the output power of the charger 1 decreases as the SOC of the battery 10 increases. In the method of guidance to a charging facility and the information presentation apparatus 100 according to one or more embodiments of the present invention, the charging time T1 at the high-output charging facility and the charging time T2 at the low-output charging facility are estimated in accordance not only with the maximum output power of the charging facilities but also with the SOC of the battery 10. This allows the charging times T1 and T2 to be estimated in accordance with the actual output power of the charger 1 and it is therefore possible to estimate the difference ($|T1-T2|$) between the charging times at the high-output charging facility and at the low-output charging facility with a high degree of accuracy.

As illustrated in FIG. 4, the output power of the charger 1 decreases as the temperature of the battery 10 lowers. In the method of guidance to a charging facility and the information presentation apparatus 100 according to one or more embodiments of the present invention, the charging time T1 at the high-output charging facility and the charging time T2 at the low-output charging facility are estimated in accordance not only with the maximum output power of the charging facilities and the SOC of the battery 10 but also with the temperature of the battery 10. This allows the charging times T1 and T2 to be estimated in accordance with the actual output power of the charger 1 and it is therefore possible to estimate the difference ($|T1-T2|$) between the charging times at the high-output charging facility and at the low-output charging facility with a high degree of accuracy.

In the method of guidance to a charging facility and the information presentation apparatus 100 according to one or more embodiments of the present invention, when a plurality of charging facilities is searched, a high-output charging facility is specified from among the plurality of charging facilities, and a low-output charging facility in a predetermined positional relationship with the specified high-output charging facility is searched. The high-output charging facility is specified, such as by the user of the electric vehicle selecting it from the charging facilities displayed on the display of the navigation device. This allows the user of the electric vehicle to be presented with the low-output charging facility which is in the predetermined positional relationship with the specified high-output charging facility and at which the difference in the charging time from that at the high-output charging facility is a predetermined value or less.

In addition or alternatively, for the high-output charging facility, a low-output charging facility is searched at which the difference between the estimated value of the moving time from the current position of the electric vehicle to the low-output charging facility and the estimated value of the moving time from the current position of the electric vehicle to the high-output charging facility is a predetermined value or less. This allows the user of the electric vehicle to be presented with the low-output charging facility at which the difference in the moving time from that at the specified high-output charging facility is the predetermined value or less and the difference in the charging time from that at the specified high-output charging facility is a predetermined value or less. It is therefore possible to recommend the low-output charging facility to the user of the electric vehicle without giving a sense of dissatisfaction.

In addition or alternatively, when a destination is set and a high-output charging facility existing between the current position of the electric vehicle and the destination is specified, a low-output charging facility is searched from which the distance to the specified high-output charging facility is a predetermined value or less. Here, the distance between the specified high-output charging facility and the low-output charging facility is the predetermined value or less, so that the difference between the moving time from the current position of the electric vehicle to the specified high-output charging facility and the moving time from the current position of the electric vehicle to the low-output charging facility is a predetermined value or less. This allows the user of the electric vehicle to be presented with the low-output charging facility at which the difference in the moving time from that at the specified high-output charging facility is the predetermined value or less and the difference in the charging time from that at the specified high-output charging facility is the predetermined value or less. It is therefore possible to recommend the low-output charging facility to the user of the electric vehicle without giving a sense of dissatisfaction.

In addition or alternatively, when a destination is not set or when a high-output charging facility that is not present between the current position of the electric vehicle and a destination is specified, for the high-output charging facility, a low-output charging facility is searched to which the distance from the current position of the electric vehicle is a predetermined value or less. Here, the difference between the distance from the current position of the electric vehicle to the specified high-output charging facility and the distance from the current position of the electric vehicle to the low-output charging facility is a predetermined value or less, so that the difference between the moving time from the current position of the electric vehicle to the specified high-output charging facility and the moving time from the current position of the electric vehicle to the low-output charging facility is a predetermined value or less. This allows the user of the electric vehicle to be presented with the low-output charging facility at which the difference in the moving time from that at the specified high-output charging facility is the predetermined value or less and the difference in the charging time from that at the specified high-output charging facility is the predetermined value or less. It is therefore possible to recommend the low-output charging facility to the user of the electric vehicle without giving a sense of dissatisfaction.

In the method of guidance to a charging facility and the information presentation apparatus 100 according to one or more embodiments of the present invention, the current remaining charged capacity of the battery 10 of the electric vehicle is detected, the distance from the current position of the electric vehicle to each of the charging facilities is calculated, and the remaining charged capacity of the battery 10 if traveling to each of the charging facilities is estimated in accordance with the detected current remaining charged capacity of the battery 10 and the calculated distance. This allows for estimation of the time T1, T2 for charging the battery 10 of the electric vehicle to full charge at each of the charging facilities.

Here, as described above, the power consumption (W) increases as the temperature of the battery 10 decreases even when the travel distance is the same because the internal resistance of the battery 10 increases as the temperature of the battery 10 decreases. To cope with this, in the method of guidance to a charging facility and the information presentation apparatus 100 according to one or more embodiments of the present invention, the remaining charged capacity of the battery 10 if traveling to each of the charging facilities is estimated in accordance with the temperature of the battery 10 in addition to the current remaining charged capacity of the battery 10 and the distance from the current position of the electric vehicle to each of the charging facilities. This allows for estimation of the time T1, T2 for charging the battery 10 of the electric vehicle to full charge at each of the charging facilities with a higher degree of accuracy.

The above information presentation apparatus 100 corresponds to an example of the information presentation apparatus according to the present invention, the above presentation device 130 corresponds to an example of the presentation device according to the present invention, and the above control device 170 corresponds to an example of the control device according to the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention. For example, in the above-described embodiments, one or more recommended low-output charging facilities are displayed using marks F thereby to present them to the user of the electric vehicle, but a recommended low-output charging facility may be set as the destination or the location on a route on the navigation device thereby to present it to the user of the electric vehicle.

In the above-described embodiments, each of the charging time T1 at a high-output charging facility and the charging time T2 at a low-output charging facility is a charging time to full charge, but may also be a charging time to a predetermined charged capacity less than full charge. In this case, the predetermined charged capacity may be set by the user of the electric vehicle.

In the above-described embodiments, the charging time T1, T2 is estimated on the basis of the maximum output power of the charger 1 and the SOC and temperature of the battery 10, but the present invention is not limited to this. For example, the charging time T1, T2 may also be estimated on the basis of the outside air temperature instead of the temperature of the battery 10.

DESCRIPTION OF REFERENCE NUMERALS

100 Information presentation apparatus
130 Presentation device
170 Control device

The invention claimed is:

1. A method for recommending a charging facility to a user of an electric vehicle, comprising:
   searching for charging facilities existing within a range of a predetermined distance from a current position of the electric vehicle;
   detecting, by a sensor of the electric vehicle, a current value of a remaining charged capacity of a battery of the electric vehicle;
   when a first charging facility and another charging facility having lower output power than that of the first charging facility are searched, calculating, based on the current value of the remaining charged capacity of the battery of the electric vehicle, an estimated value of the remaining charged capacity of the battery of the electric vehicle if traveling to each of the searched charging facilities, the other charging facility being in a predetermined positional relationship with the first charging facility;
   calculating an estimated value of a charging time if charging the electric vehicle from the estimated value of the remaining charged capacity to a predetermined charged capacity at each of the searched charging facilities; and
   when a difference between the estimated value of the charging time at the first charging facility and the estimated value of the charging time at the other charging facility is a predetermined value or less, presenting the other charging facility as a recommended charging facility to the user of the electric vehicle.

2. The method according to claim 1, wherein the estimated value of the charging time is calculated on a basis of maximum output power of the charging facility and a present state of charge of the electric vehicle.

3. The method according to claim 2, wherein the estimated value of the charging time is calculated on a basis of a battery temperature of the electric vehicle.

4. The method according to claim 1, wherein when a plurality of charging facilities is searched, the first charging facility is specified from among the plurality of charging facilities, and the other charging facility in the predetermined positional relationship with the specified first charging facility is searched.

5. The method according to claim 4, comprising: presenting the searched charging facilities to the user of the electric vehicle; acquiring selection information that the user of the electric vehicle selects a presented charging facility; and when the first charging facility is selected in the acquired selection information, specifying the first charging facility.

6. The method according to claim 1, wherein the predetermined positional relationship is a positional relationship in which a difference between estimated values of moving times when the electric vehicle moves from the current position to the searched charging facilities is a predetermined value or less.

7. The method according to claim 1, wherein the predetermined positional relationship is a positional relationship in which a distance between the first charging facility and the other charging facility is a predetermined value or less.

8. The method according to claim 1, wherein the predetermined positional relationship is a positional relationship in which a difference between a distance from the current position of the electric vehicle to the first charging facility and a distance from the current position of the electric vehicle to the other charging facility is a predetermined value or less.

9. The method according to claim 1, wherein the first charging facility comprises a charging facility having larger output power than the other charging facility.

10. The method according to claim 1, comprising:
    calculating a distance from the current position of the electric vehicle to each of the searched charging facilities; and
    wherein the estimated value of the remaining charged capacity of the electric vehicle if traveling to each of the searched charging facilities is further calculated in accordance with the calculated distance from the current position of the electric vehicle to each of the searched charging facilities.

11. The method according to claim 10, comprising:

detecting a battery temperature of the electric vehicle; and wherein the estimated value of the remaining charged capacity of the electric vehicle if traveling to each of the searched charging facilities is further calculated in accordance with the detected battery temperature.

12. An information presentation apparatus comprising:

a presentation device; and a control device configured to control the presentation device to present a recommended charging facility to a user of an electric vehicle, the control device being further configured to:

search for charging facilities existing within a range of a predetermined distance from a current position of the electric vehicle;

obtain a current value of a remaining charged capacity of a battery of the electric vehicle that was detected by a sensor of the electric vehicle;

when a first charging facility and another charging facility having lower output power than that of the first charging facility are searched, calculate, based on the current value of the remaining charged capacity of the battery of the electric vehicle, an estimated value of the remaining charged capacity of the battery of the electric vehicle if traveling to each of the searched charging facilities, the other charging facility being in a predetermined positional relationship with the first charging facility;

calculate an estimated value of a charging time if charging a secondary battery of the electric vehicle from the estimated value of the remaining charged capacity to a predetermined charged capacity at each of the searched charging facilities; and     when a difference between the estimated value of the charging time at the first charging facility and the estimated value of the charging time at the other charging facility is a predetermined value or less, control the presentation device to present the other charging facility as a recommended charging facility to the user of the electric vehicle.

* * * * *